US011831696B2

(12) United States Patent
Foufa et al.

(10) Patent No.: US 11,831,696 B2
(45) Date of Patent: Nov. 28, 2023

(54) OPTIMIZING RICHNESS IN A REMOTE MEETING

(71) Applicant: Microsoft Technology Licensing, LLC, Redmond, WA (US)

(72) Inventors: Mastafa Hamza Foufa, Nimes (FR); Romain Gabriel Paul Rey, Vancouver (CA)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/649,783

(22) Filed: Feb. 2, 2022

(65) Prior Publication Data

US 2023/0247072 A1 Aug. 3, 2023

(51) Int. Cl.
*H04L 65/403* (2022.01)
*H04L 65/1069* (2022.01)
*H04L 65/80* (2022.01)

(52) U.S. Cl.
CPC ........ *H04L 65/403* (2013.01); *H04L 65/1069* (2013.01); *H04L 65/80* (2013.01)

(58) Field of Classification Search
CPC .... H04L 65/403; H04L 65/1069; H04L 65/80
USPC ........................................................ 709/204
See application file for complete search history.

(56) References Cited

U.S. PATENT DOCUMENTS

| | | | |
|---|---|---|---|
| 7,184,602 B2 | 2/2007 | Cohen et al. | |
| 7,881,235 B1 | 2/2011 | Westen et al. | |
| 8,675,525 B2 | 3/2014 | Lee et al. | |
| 8,692,863 B2 | 4/2014 | Tucker et al. | |
| 9,065,919 B2 * | 6/2015 | Arthur | ................ H04L 12/1827 |
| 9,753,927 B2 | 9/2017 | Cunico et al. | |
| 10,091,734 B2 | 10/2018 | Luna et al. | |
| 10,187,433 B2 | 1/2019 | Maistri et al. | |
| 10,334,110 B2 | 6/2019 | Herrin et al. | |

(Continued)

FOREIGN PATENT DOCUMENTS

| | | |
|---|---|---|
| CN | 101742223 B | 8/2012 |
| EP | 2814244 A1 | 12/2014 |

(Continued)

OTHER PUBLICATIONS

"Bandwidth Planning in your Cisco Webex Meetings Environment White Paper", In White Paper of Cisco, Apr. 13, 2021, 22 Pages.

(Continued)

*Primary Examiner* — Zi Ye
(74) *Attorney, Agent, or Firm* — Alleman Hall Creasman & Tuttle LLP

(57) ABSTRACT

A method for one or more meeting-facilitating machines to provide access to a remote meeting comprises assessing a capability metric of a meeting-participant computer device; selecting an access-option set including a combination of mutually compatible access modes, each access mode characterized by (a) an expense metric comparable to the capability metric and (b) a richness metric indicating a relative level of richness the access mode contributes to the remote meeting, the access-option set selected to maximize a net richness of the remote meeting while preventing a net expense of the access-option set from exceeding the capability metric; and providing the meeting-participant computer device access to the remote meeting using the access-option set.

19 Claims, 5 Drawing Sheets

(56) References Cited

U.S. PATENT DOCUMENTS

| | | | |
|---|---|---|---|
| 10,375,354 B2 | 8/2019 | Sathya et al. | |
| 10,572,858 B2 | 2/2020 | Nelson et al. | |
| 11,528,306 B1* | 12/2022 | Subbaiyan | H04L 65/80 |
| 2002/0051491 A1 | 5/2002 | Challapali et al. | |
| 2007/0206581 A1* | 9/2007 | Nam | H04L 65/1101 370/356 |
| 2008/0151786 A1 | 6/2008 | Li et al. | |
| 2010/0060647 A1* | 3/2010 | Brown | G06T 13/40 345/473 |
| 2012/0242776 A1* | 9/2012 | Tucker | H04N 7/147 348/E7.083 |
| 2014/0267570 A1* | 9/2014 | Weber | H04N 7/15 348/14.08 |
| 2014/0320591 A1* | 10/2014 | Baron, Jr. | G09G 5/14 348/14.08 |
| 2015/0085057 A1 | 3/2015 | Ouyang et al. | |
| 2015/0281645 A1* | 10/2015 | Pai | H04N 7/15 348/14.1 |
| 2018/0375676 A1 | 12/2018 | Bader-natal et al. | |
| 2019/0215482 A1 | 7/2019 | Sathya et al. | |

FOREIGN PATENT DOCUMENTS

| | | | |
|---|---|---|---|
| JP | 6866860 B2 | 4/2021 | |
| WO | 9626587 A1 | 8/1996 | |

OTHER PUBLICATIONS

"Blackboard Help", Retrieved from: https://help.blackboard.com/Collaborate/Ultra/Administrator/Low_Bandwidth_Management, Apr. 2010, 12 Pages.

"Dell Optimizer. Technology that Adapts as Fast as you do.", Retrieved from: https://www.delltechnologies.com/en-in/work-at-full-speed/optimizer.htm, Jun. 23, 2020, 13 Pages.

"Introducing gentle quality notifications with tailored recommendations and quick actions", https://workspaceupdates.googleblog.com/2021/06/google-meet-gentle-quality-notifications-tailored-recommendations.html, Jun. 1, 2021, 5 Pages.

Apostolopoulos, John, "Improving Networks with Artificial Intelligence", Retrieved from: https://blogs.cisco.com/networking/improving-networks-with-ai, Jun. 5, 2019, 13 Pages.

Beatrice, Adilin, "Video Conferencing Gets More Sophisticated With Ai Applications", Retrieved from: https://www.analyticsinsight.net/video-conferencing-gets-more-sophisticated-with-ai-applications/, Jan. 4, 2021, 7 Pages.

Dhingra, Anurag, "Collaboration in the Age of AI: How Cisco is Pioneering the Use of AI and Emerging Technology Within Collaboration", Retrieved from: https://blog.webex.com/video-conferencing/collaboration-in-the-age-of-ai-how-cisco-is-pioneering-the-use-of-ai-and-emerging-technology-within-collaboration/, Oct. 12, 2020, 17 Pages.

Hou, et al., "Background Features in Google Meet, Powered by Web ML", Published in Google AI Blog, Oct. 30, 2020, 9 Pages.

Lidman, Pontus, "AI Can Tame Conferencing's Hunger for Bandwidth", Retrieved from: https://www.electronicdesign.com/technologies/embedded-revolution/article/21159949/synaptics-ai-can-tame-conferencings-hunger-for-bandwidth, Apr. 16, 2021, 13 Pages.

Pousman, et al., "Optimizing Performance of Zoom in Low Bandwidth Environments", Retrieved from: https://assets.zoom.us/docs/user-guides/User%20Guide%20-%20Optimizing%20Performance%20in%20Low%20Bandwidth%20Environments.pdf, Apr. 2021, 2 Pages.

Tung, Liam, "Bad Video Call Quality? Google's New Tool Could Help you Work out What's Going Wrong", Retrieved from: https://www.zdnet.com/article/googles-new-tool-helps-you-discover-why-your-video-call-is-so-bad/, Jan. 13, 2021, 6 pages.

Salian, Isha., "More Than Meets the AI: How GANs Research is Reshaping Video Conferencing", Retrieved from: https://blogs.nvidia.com/blog/2021/06/24/vid2vid-cameo-ai-research-video-conferencing/, Jun. 24, 2021, 16 Pages.

"International Search Report and Written Opinion Issued in PCT Application No. PCT/US22/050813", dated Mar. 20, 2023, 10 Pages.

* cited by examiner

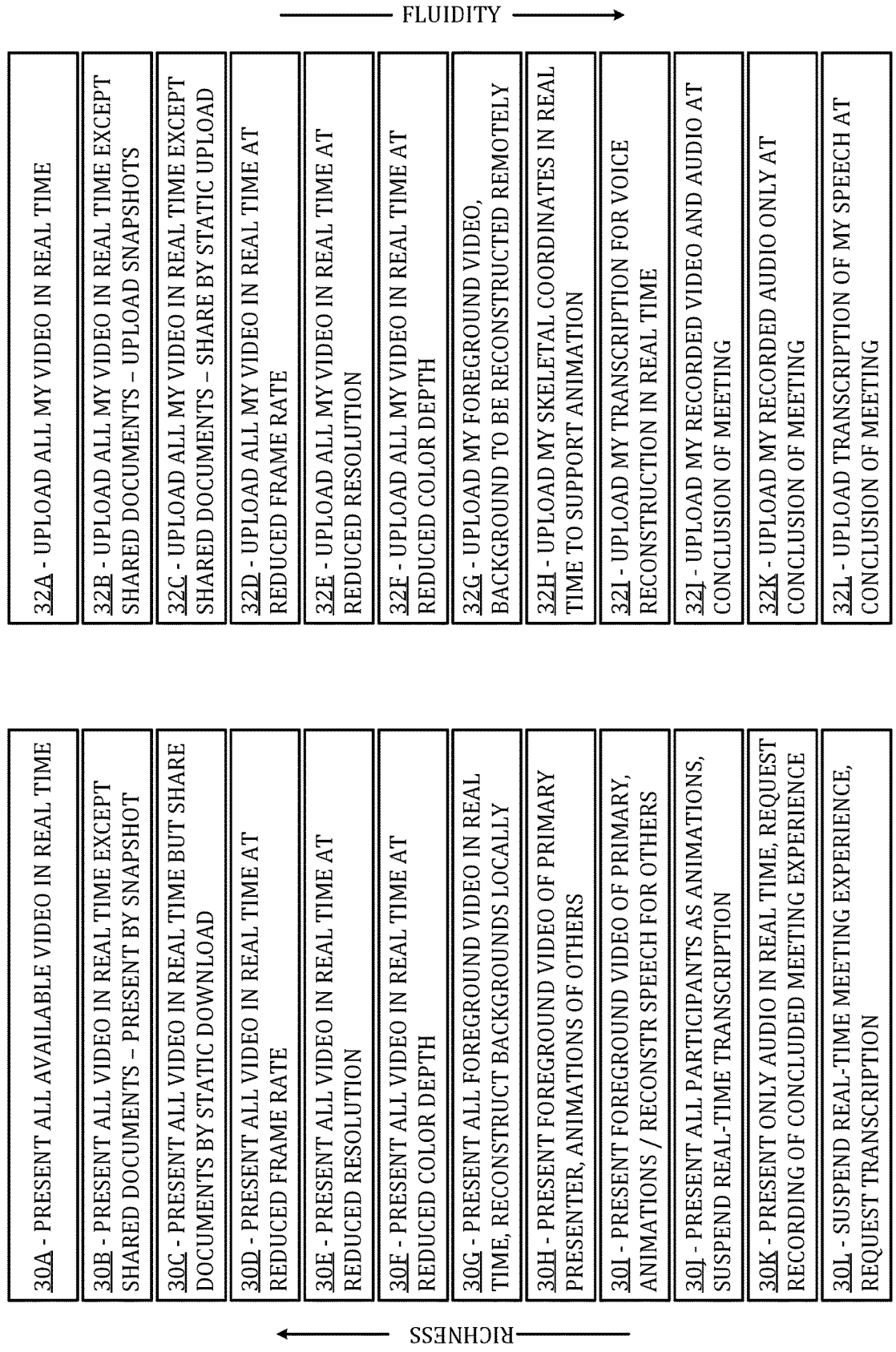

OPTIMIZING RICHNESS IN A REMOTE MEETING

BACKGROUND

In recent years, video teleconferencing has evolved into a sophisticated, ubiquitous technology. Video teleconferencing now offers many useful features, options, and modes of remote interaction. Video teleconferencing can be implemented on networked computer devices of various kinds, linked, in many implementations to a central, back-end service.

SUMMARY

One aspect of this disclosure relates to a method for one or more meeting-facilitating machines to provide access to a remote meeting. The method comprises assessing a capability metric of a meeting-participant computer device and selecting an access-option set including a combination of mutually compatible access modes. Each access mode is characterized by (a) an expense metric comparable to the capability metric and (b) a richness metric indicating a relative level of richness the access mode contributes to the remote meeting. The access-option set is selected to maximize a net richness of the remote meeting while preventing the net expense of the access-option set from exceeding the capability metric. The method further comprises providing the meeting-participant computer device access to the remote meeting using the access-option set.

Another aspect of this disclosure relates to a computer device configured to access a remote meeting experience. The computer device comprises a logic system coupled operatively to a computer-memory system. The computer-memory system holds instructions that cause the logic system to execute a client application, including: (a) instructions to assign a numeric capability metric to a capability data structure based on estimating a capability of the computer device, (b) instructions to select, based on the capability estimated, an access option achievable on the computer device for accessing the remote meeting experience, wherein the access option is a combination of mutually compatible electronic-display or network data-transfer modes of access for the remote meeting experience and is selected to offer the remote meeting experience at or above a threshold level of a numeric fluidity metric, and wherein the fluidity is evaluated in dependence on the capability metric and stored in a fluidity data structure, and (c) instructions to configure the computer device to access the remote meeting experience using the access option selected.

This Summary is provided to introduce in simplified form a selection of concepts that are further described in the Detailed Description. This Summary is not intended to identify key features or essential features of the claimed subject matter, nor is it intended to be used to limit the scope of the claimed subject matter. The claimed subject matter is not limited to implementations that solve any disadvantages noted in any part of this disclosure.

BRIEF DESCRIPTION OF THE DRAWINGS

FIG. 3 shows an example menu of inbound-access options for inbound access to a remote meeting by a meeting-participant computer device.

FIG. 4 shows an example menu of outbound-access options for outbound access to a remote meeting by a meeting-participant computer device.

DETAILED DESCRIPTION

As noted above, video teleconferencing has evolved to include many useful features, options, and modes of remote interaction. At the same time, video teleconferencing has acquired worldwide scope. With the rapid proliferation of this technology, certain issues have emerged owing to the heterogeneity of the hardware used to support the technology. In short, richly featured remote meeting experiences may be available via state-of-the-art computer devices with large displays and fast internet connections. Attempting to achieve such experiences using older devices or devices with smaller displays or slow internet connections may result in poor technologic performance, leaving the user feeling frustrated or dissatisfied. Issues that some users may struggle with include display-screen clutter, excessive latency, and video that stalls, becomes choppy, or fails to synchronize to the corresponding audio.

Inasmuch as sub-optimal internet access and reliance on legacy devices may correlate to users in developing countries and/or users working outside of major metropolitan areas, there is a risk that meeting experiences targeting primarily high-end technology and access may work against the inclusiveness and equity typically sought for teleconferencing strategies marketed or otherwise offered worldwide.

This disclosure presents a broadly applicable strategy for addressing the above issues; the methods herein are useable to provide better meeting experiences to user devices of all kinds, with extreme variability of internet connection speed, processor speed, display size, etc. Central to these methods is the act of assessing, at a high granularity, the capabilities of each computer device used to access a remote meeting experience. Using that information, the methods herein compute the level of fluidity (i.e., technologic smoothness) that may be expected for each of a series of combinations of features that potentially could be integrated into a remote meeting experience. The methods automatically select the combination of features that will provide the richest experience at or above a satisfactory level of fluidity, given the capabilities of each meeting-participant computing device. In this manner, each meeting participant is furnished the best experience possible, subject to the inevitable constraints of hardware and location.

Figure 1:
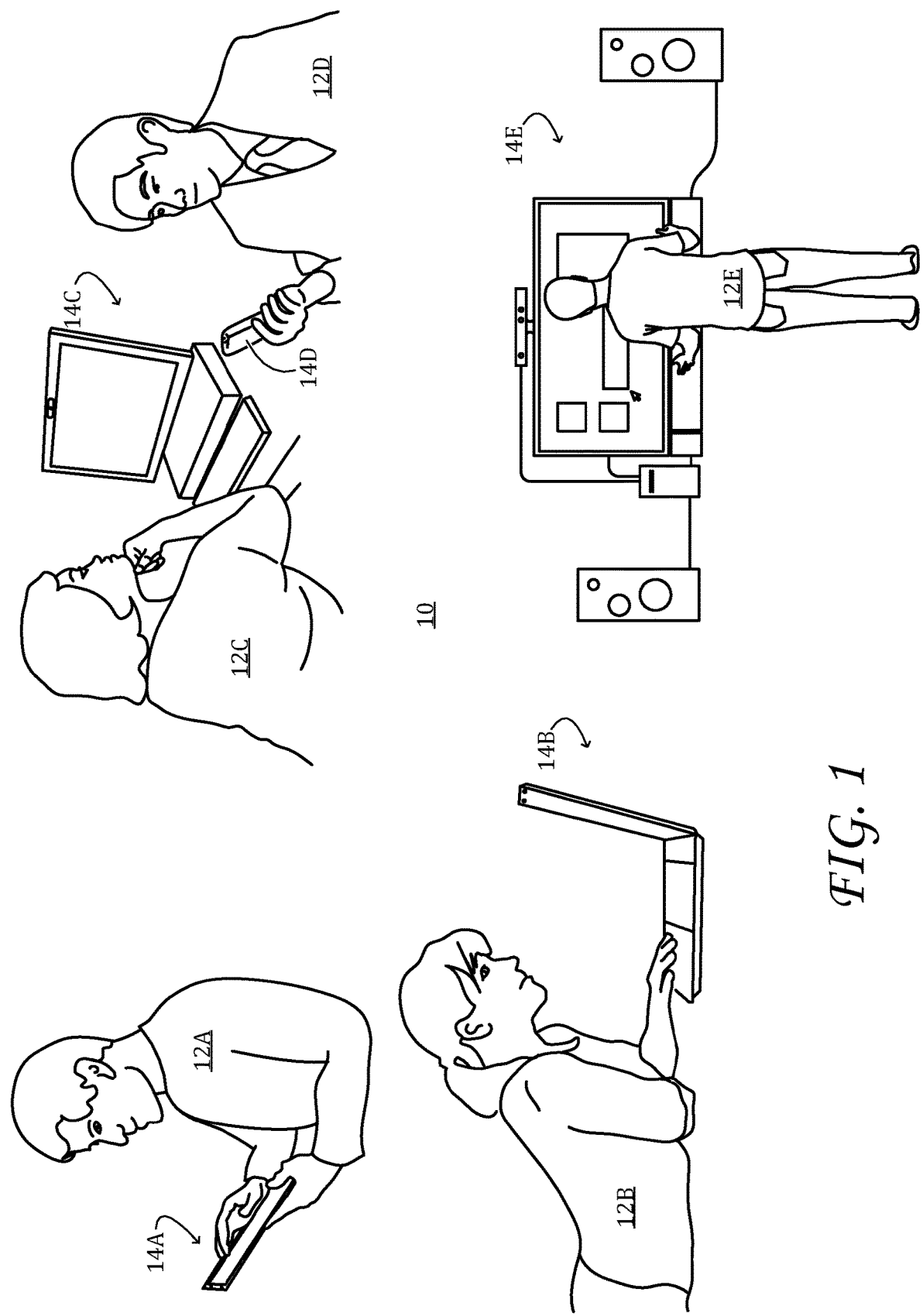
FIG. 1 shows aspects of a remote meeting experience shared by a plurality of meeting participants.
Figure 2:
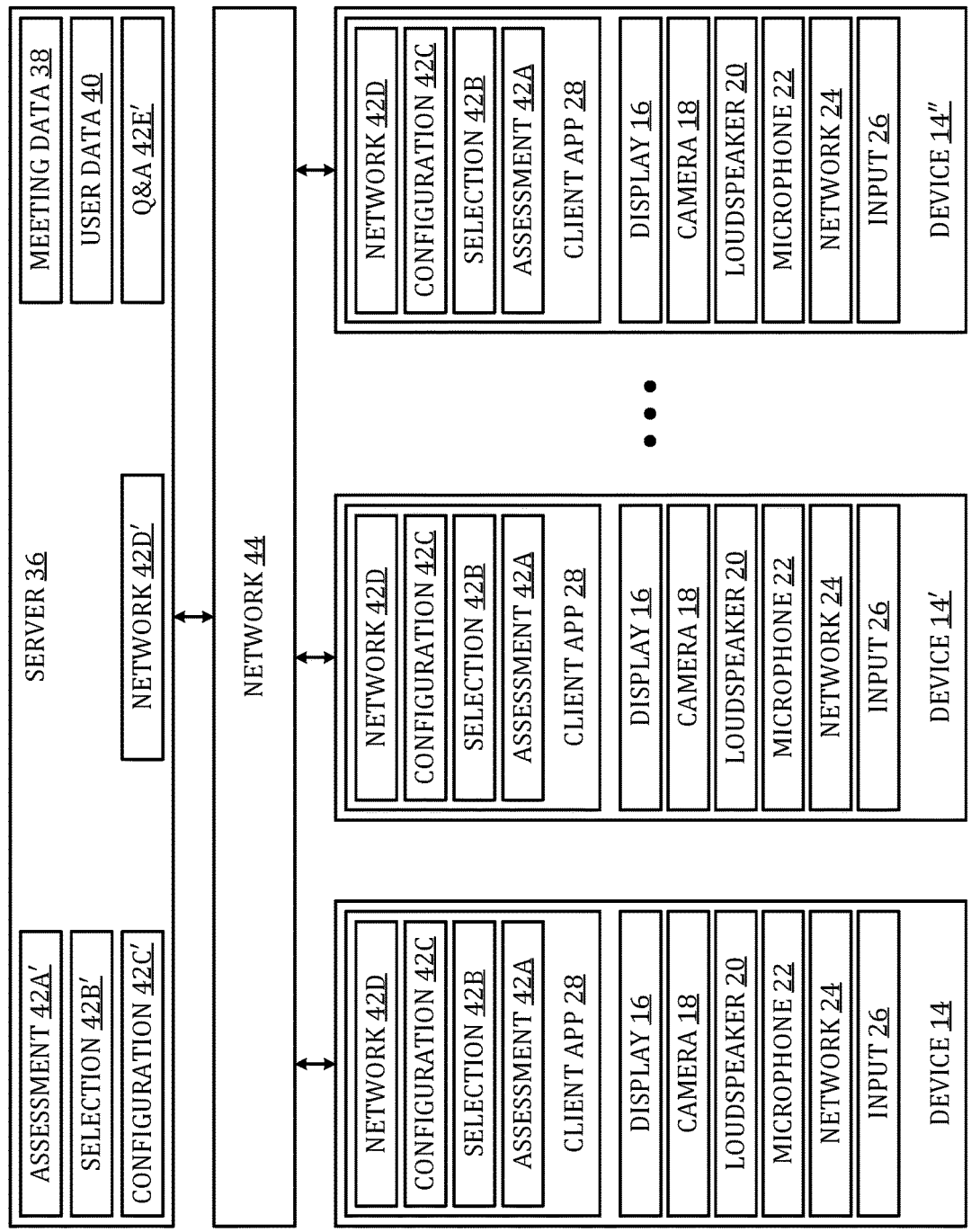
FIG. 2 shows aspects of an example client-server system configured to support a remote meeting.

Turning now to the drawings, FIG. 1 shows aspects of a remote meeting experience 10 shared by a plurality of meeting participants 12. The meeting experience is 'remote' because not all of the participants are in the same place. Each meeting participant is a user and operator of a corresponding meeting-participant computer device 14. Computer devices of all kinds—desktop computers, laptop computers, tablet computers, home-theater systems, virtual-reality (VR) and augmented-reality (AR) systems, game systems, and smartphones, for instance—may be used to access the meeting experience. To that end, and turning now to FIG. 2, each meeting-participant computer device 14 includes a display 16, a camera 18, a loudspeaker 20, and a microphone 22. Each computer device 14 includes network hardware and software componentry 24 to enable interconnection via a network. The network connection may be wired or wireless. Any, some, or all of the computer devices may also include input componentry 26 such as a touch screen, keyboard, mouse, and/or track pad, for example. Each computer device 14 in FIG. 2 is configured to execute a client application 28. The client application is a computer program configured to provide user access to the remote meeting experience. In some examples, the client application can be a stand-alone application. In other examples, the client application may be an extension of another application or of an operating system (OS)—a browser extension, plug-in, or OS extension, for instance.

As illustrated in the following examples, the access to the remote meeting experience provided via client application 28 includes access modes including one or more inbound-access modes and/or one or more outbound-access modes. An inbound-access mode is a mode by which data is received into a computer device 14; an outbound-access mode is a mode by which data is transmitted from the computer device. Some of the available inbound-access modes may comprise real-time presentation of video and/or audio of one or more remote meeting participants. In some inbound-access modes the video and/or audio is presented at the highest fidelity available; in other inbound-access modes the fidelity is reduced. As applied to video, 'fidelity' may comprise frame rate, resolution, and/or color depth. As applied to audio, 'fidelity' may comprise sampling rate and/or bit rate. In some examples, a network service (vide infra) offers the same underlying content at different levels of fidelity on different network channels; computer device 14 samples the channel corresponding to the desired fidelity. The fidelity metric may be further extended in certain contexts. In some examples, access options of highest fidelity may comprise real-time presentation of 3D video of a meeting participant or of an animation presented during a meeting. Such video may be suitable for presentation on a VR or AR display configured to offer this mode of inbound access. In some examples, the user may be offered the ability to move or otherwise manipulate a 3D video rendering or portion thereof.

Some inbound-access modes comprise real-time presentation of only the foreground portion of the video, the background portion being reconstructed locally on computer device 14. Some inbound-access modes comprise presenting a locally rendered animation (e.g., avatar) of one or more meeting participants. Animations may be generated locally for any, some, or all of the meeting participants based on facial markers and/or skeletal coordinates made available for real-time download to the computer device. Some inbound-access modes comprise inbound in-meeting chat via a texting interface provided on the computer device. Some inbound-access modes comprise receiving a real-time transcription of audio from the meeting experience. Some inbound-access modes comprise presenting locally reconstructed speech from one or more meeting participants based on the transcription. Some inbound-access modes comprise screen or document sharing among the meeting participants. In some inbound-access modes a portion of a shared document is downloaded as video in real time. In some inbound-access modes a portion of a shared document is downloaded as a still image, or snapshot, triggered by changes made to the document in real time. In some inbound-access modes a shared document is downloaded via static download to the computer device. In some such examples, a page-turn command may be received and enacted by the computer device, so that the user has synchronized access to the shared content. Some inbound-access modes comprise receiving a recording of the audio and/or video of a concluded meeting experience. Some inbound-access modes comprise receiving a transcription of the audio of a concluded meeting experience.

Some of the available outbound-access modes may comprise real-time upload of video and/or audio from computer device 14. By analogy to the description above, the video and/or audio may be uploaded at the highest fidelity available or at lower fidelity. Some outbound-access modes comprise real-time upload of only the foreground portion of the video, the background portion being remotely reconstructed. In such modes the foreground-only video stream is created locally on the computer device from which the video is uploaded (e.g., in client application 28). Some outbound-access modes comprise uploading facial markers and/or skeletal coordinates to render an animation of the user of the computer device. Based on such coordinates, which may be downloaded in real time to the computer devices of one or more other meeting participants, an animation of the user may be generated remotely for the benefit of the other meeting participants. Some outbound-access modes comprise outbound in-meeting chat via a texting interface. Some outbound-access modes comprise uploading a real-time transcription of the user's audio contributions to the meeting experience. Some outbound-access modes comprise screen or document sharing, where content from computer device 14 is shared among the other meeting participants. In some outbound-access modes a portion of a shared document is uploaded as video in real time from computer device 14. In some outbound-access modes a portion of a shared document is uploaded as a still image, or snapshot, triggered by changes that the user makes to the document in real time. In some outbound-access modes a shared document is statically uploaded from computer device 14. In some examples, a page-turn command may be uploaded from computer device 14 and made available to the computer devices of the other meeting participants, so that all meeting participants have synchronized access to the shared document. Some outbound-access modes comprise uploading a recording of the audio and/or video of the user's contributions at or after the conclusion of the meeting experience. Some outbound-access modes comprise uploading a transcription of the audio of the user's contributions at or after the conclusion of the meeting experience.

Indeed a great many modes of accessing remote meeting experience 10 may be available on a given computer device 14 via client application 28. Some combinations of access modes provide additive benefits, while other combinations may conflict or be superfluous. Accordingly, client application 28 is configured to offer certain predefined combinations of mutually compatible access modes based on the capabilities of computer device 14 and/or on the preferences of the user thereof. In doing so, the client application provides different variants or levels of access to the meeting experience, which correspond to the different 'access options' herein.

In some examples, one access option may be selected from a menu of inbound-access options, and another access option may be selected from a menu of outbound-access options. An inbound-access option is an option controlling the data received into computer device 14; an outbound-access option is an option controlling the data transmitted from the computer device. FIG. 3 shows an example partial menu of inbound-access options 30, and FIG. 4 shows an example partial menu of outbound-access options 32. Each menu is listed in order of decreasing 'richness' from top to bottom—i.e., the access options at the top of each menu provide a richer meeting experience than the options at the bottom. It will be understood that the menus of inbound- and outbound-access options shown in the drawings are non-limiting, non-exhaustive, and provided for ease of illustration. A meeting may alternatively and/or additionally be provided with any combination of alternative video features, alternative audio features, alternative chat features, alternative presentation features, alternative virtualization features, and/or other alternative features. The solutions herein are applicable to virtually any menu of available access options.

In some implementations, each access mode may be characterized by a richness metric that indicates a relative level of richness that access mode contributes to the meeting experience. Similarly, each access mode may be characterized by an expense metric that indicates the relative computing expense (e.g., network bandwidth, processing cycles) that access mode requires. The richness metric can be implemented as a number in a richness data structure (e.g., a real number numerically comparable to other real numbers using less than (<), greater than (>) and equal (=) operators) and/or compatible with arithmetic). Similarly, the expense metric can be implemented as a number in an expense data structure. However, other non-numeric data structures are possible. In general, any metric that is useable to compute a net richness (e.g., the collective richness provided by a selected access-option set of mutually compatible access options) may be used. Similarly, any metric useable to compute a net expense (e.g., the collective expense required by a selected access-option set of mutually compatible access options) and comparable to a capability of a meeting-participant computer device may be used.

In FIG. 3, inbound-access option 30A provides presentation of all available video in real time, including screen and document sharing as video. As such, inbound-access option 30A has a richness metric indicating a highest level of richness compared to all options in FIG. 3; and inbound-access option 30A has an expense metric indicating the greatest expense compared to all options in FIG. 3. Inbound-access option 30B provides presentation of all available video of the meeting participants, but uses snapshots to share documents. Inbound-access option 30C differs from options 30A and 30B in that screen or document sharing is only available via static download. Inbound-access option 30D provides presentation of all video at a reduced (e.g., 75%) frame rate. Inbound-access option 30E provides presentation of all video at reduced (e.g., 50%) display resolution. Inbound-access option 30F provides presentation of all video at reduced (e.g., 25%) color depth. Inbound-access option 30G presents all available foreground video in real time, and at full fidelity, but requires local reconstruction of the background. Some inbound-access options reject at least some of the available live video and instead use animations to represent one or more meeting participants. For instance, inbound-access option 30H provides presentation of foreground video of the primary presenter only. Animations are generated locally for the other meeting participants based on facial markers and/or skeletal coordinates of the meeting participants downloaded in real time to the user's computer device. Inbound-access option 30I differs from inbound-access option 30H in that the speech of non-presenting participants is not downloaded in real time to the user's computer device, but is reconstructed thereon based on a real-time transcription of the meeting audio. Inbound-access option 30J includes real-time presentation of all meeting participants as animations and suspends download of the real-time transcription of the meeting audio. Inbound-access option 30K provides only the audio presentation in real time and requests a recording of the concluded meeting experience, including the video. Inbound-access option 30L suspends the real-time meeting experience for the user and requests a transcription of the concluded meeting experience. Accordingly, inbound-access option 30L has a richness metric indicating a lowest level of richness compared to all options in FIG. 3; and inbound-access option 30L has an expense metric indicating the least expense compared to all options in FIG. 3. The other inbound-access options have expense metrics and richness metrics that fall between those of inbound-access options 30A and 30L.

In FIG. 4, outbound-access option 32A provides upload of all video from the user's computer device in real time, including upload of shared documents as video. As such, outbound-access option 32A has a richness metric indicating a highest level of richness compared to all options in FIG. 4; and outbound-access option 32A has an expense metric indicating the greatest expense compared to all options in FIG. 4. Outbound-access option 32B provides upload of the user's video but uses snapshots to share documents. Outbound-access option 32C differs from options 32A and 32B in that screen or document sharing is enabled via static upload only. Outbound-access option 32D provides upload of the user's video at a reduced frame rate. Outbound-access option 32E provides upload of the user's video at reduced display resolution. Outbound-access option 32F provides upload of the user's video at reduced color depth. Outbound-access option 32G provides upload of the user's foreground video in real time, and at full fidelity, but requires remote reconstruction of the background. Other outbound-access options reject live-video upload. For instance, outbound-access option 32H provides upload of the user's facial markers and/or skeletal coordinates in real time to support animation of the user. Outbound-access option 32I provides upload of the transcription of the user's speech to support voice reconstruction in real time. Outbound-access option 32J provides upload of the user's recorded video and audio at the conclusion of the meeting. Outbound-access option 32K provides upload of the user's recorded audio at the conclusion of the meeting. Outbound-access option 32L suspends the real-time meeting experience for the user and provides an uploaded transcription of the user's audio contributions at the conclusion of the meeting experience. Accordingly, outbound-access option 32L has a richness metric indicating a lowest level of richness compared to all options in FIG. 4; and outbound-access option 32L has an expense metric indicating the least expense compared to all options in FIG. 4. The other outbound-access options have expense metrics and richness metrics that fall between those of outbound-access options 32A and 32L.

In examples as illustrated in FIGS. 3 and 4, where access options are selected from two or more disjoint menus, it is possible to map every combination of compatible access options into a new set whose elements correspond to those combinations. In such examples the combinations themselves are 'access options', and so the notion of selecting an access option from a menu of access options remains accurate.

An access-option set may be selected from the menus to include an access mode of a certain type (e.g., video type) selected from a plurality of different access modes corresponding to that feature type (e.g., full video vs. no video). The various access modes for a given type provide alternative meeting experiences at different expenses (e.g., as indicated by corresponding expense metrics of the plurality of different access modes), and with different levels of richness (e.g., as indicated by corresponding richness metrics of the plurality of different access modes). As such, for each feature type, an access option may be selected based on its collective contributions to richness and its individual contribution to expense. The overall mix of the selected access modes may be selected to maximize the richness and fluidity of the provided meeting experience.

Returning briefly to FIG. 2, this drawing shows aspects of an example client-server system 34 configured to support meeting experience 10. Client-server system 34 includes a plurality of meeting-participant computer devices 14, each configured to execute client application 28. The client-server system also includes a meeting-facilitating machine in the form of a server 36 configured to execute a central, back-end service to further support the meeting experience. Meeting data 38 and user data 40 are stored on the server. A plurality of code modules 42 are distributed within the server and within the client applications. In the illustrated example, the code modules include assessment modules 42A and 42A', selection modules 42B and 42B', configuration modules 42C and 42C', network modules 42D and 42D', and Q&A module 42E'. Network modules 42D and 42D' are configured to exchange data between server 36 and computer devices 14 via client application 28. The data is exchanged over network 44, which, in some examples, comprises the internet. Additional functionality of the various code modules is described hereinafter.

Figure 5:
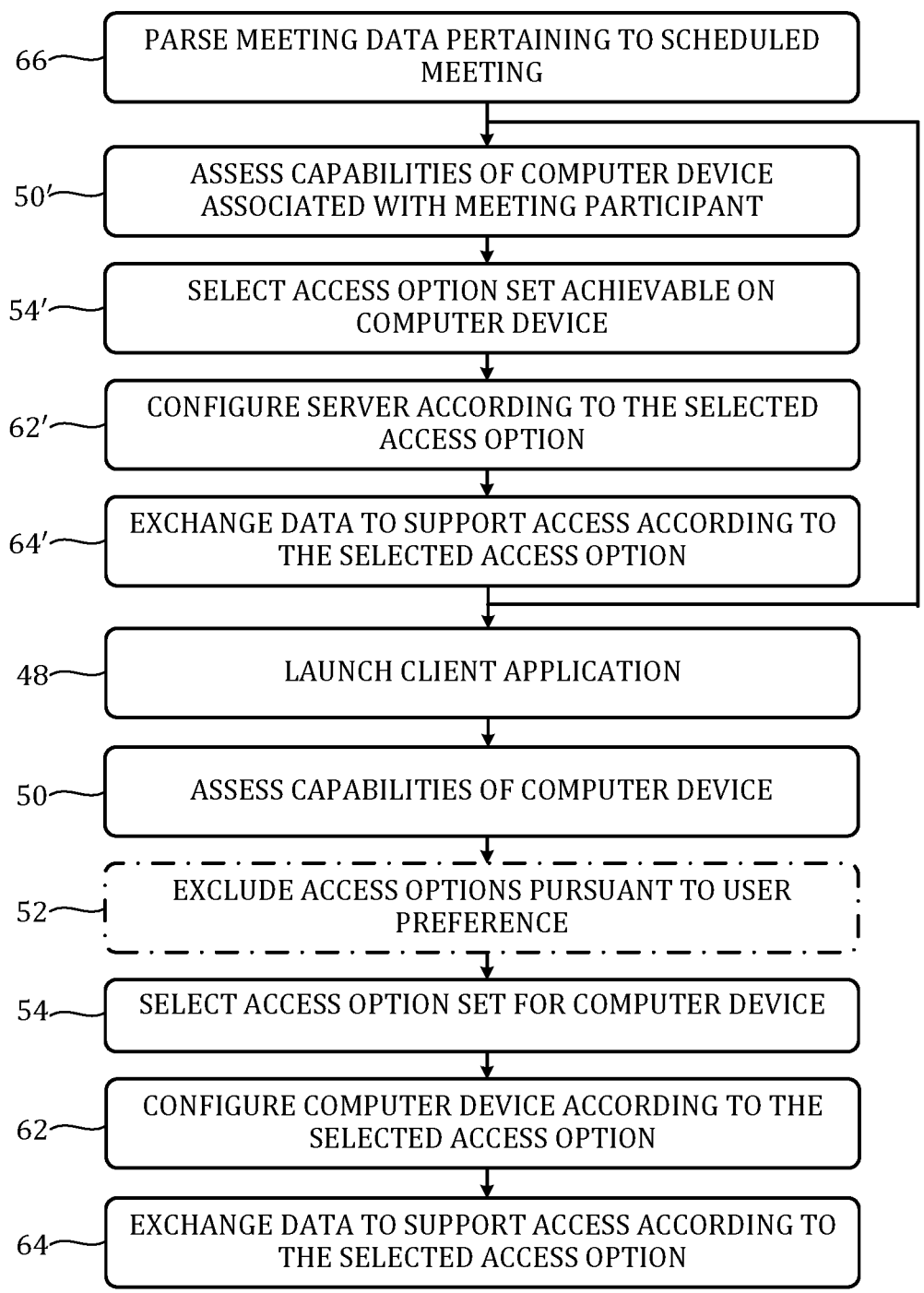
FIG. 5 shows aspects of an example method for providing access to a remote meeting.

In view of the foregoing context, FIG. 5 shows aspects of an example method 46 for one or more meeting-facilitating machines (e.g., server 36) to provide access to a remote meeting. As noted hereinabove, the remote meeting may be accessed via a plurality of meeting-participant computer devices used and operated by a corresponding plurality of users. Such users may be active participants in the remote meeting and/or non-participating observers of the meeting.

At 48 of method 46, the client application is launched on the user's meeting-participant computer device. This action may enable the user to initiate a new meeting experience or to join an existing meeting experience.

At 50 an assessment module of the client-server system assesses one or more capabilities of the user's computer device that may be relevant to the fluidity of the meeting experience as perceived by the user of the computer device. Any, some, or all of the capabilities may be variable capabilities, which are estimated or otherwise assessed as corresponding capability metrics and assigned to a capability data structure. The assessment may be enacted any time before the conclusion of the meeting experience—e.g., after the use has scheduled the meeting, right after the user has joined the meeting, or at any time during the meeting. Generally speaking, each capability assessed may be represented by a parameter value $C_i$, which, in some cases, may comprise one or more numeric values. One example capability is the network-download speed of the computer device—e.g., the average number of bits per second at which the computer device can receive data from the network. This capability may be quantified by a number—e.g., 125, corresponding to 125 thousand bits per second.

Other example capabilities include the network-upload speed of the computer device, the processor speed and number of processor cores of the computer device, the amount RAM available on the computer device, the amount of non-volatile storage available on the computer device, and the display size, display resolution, and display type (e.g., 2D, VR, or AR) of the computer device. Like the network download speed, such capabilities also may be quantified by a number—e.g., a signed or unsigned integer, a floating-point number, etc. In some examples, a computer-device capability may be assessed by reading data—e.g., data from a file associated with an application program, hardware driver, or operating system (OS), or an OS registry value—stored in the computer device. In other examples, a utility program and/or service may be used to enact the assessment. For instance, the dedicated service supporting the remote meeting experience (vide infra) may be configured to dynamically test one or more capabilities of a networked computer device via client application 28 executing on the computer device. In other examples a generic service may be used. A ping program, for instance, may be used to assess network-upload and—download speeds.

In view of the foregoing list of capabilities of a computer device (which is by no means exhaustive), the reader will note that some capabilities are fixed properties of a given computer device, while other capabilities may be influenced by conditions, use scenarios, and other factors. For example, the display size and display type are capabilities fixed by the device configuration at the point of manufacture. By contrast, the amount of available RAM depends not only on the device configuration but also on how the device is being used. A device running many background processes, for example, may have less available RAM than an identical device running only the client application. Network-upload and—download speeds may likewise be influenced by background processing, if such processing includes network access. Furthermore, even factors that are totally extrinsic to a given computer device may influence a capability of that device. A device may exhibit a slow network-download speed merely because it is connected to a slow network. The same device may enjoy improved capabilities pursuant to changing location, for instance, or switching to a different internet service provider (ISP). Similarly, a computer device being operated under extreme temperatures my exhibit lower capabilities than the same device operating at normal temperatures due to cooling requirements, battery performance, etc. As used herein, the term 'capability of a computer device' is to be understood in this broad context to include all intrinsic and extrinsic factors that influence the fluidity of a meeting experience.

Any number of assessed capabilities $C_i$ may be represented and stored digitally as a vector C, or as any other suitable capability data structure. Any such representation of meeting-participant computer device capability, whether including one or more sub-components (e.g., network bandwidth, RAM, display size), is referred to herein as a capability metric. The capability metric may take any form that is comparable against different expense metrics. In examples in which two or more component capabilities are assessed, the capabilities may be assessed concurrently or sequentially. Thus, any data structure representing the various capabilities of a given computer device may evolve over time as additional capabilities are assessed. Some capabilities may be fixed over the timescale of a single meeting experience, while other capabilities may vary in time. For example, the display resolution is typically a fixed value, but the network-download speed may vary.

The reader will recall the discussion of access options introduced in connection to FIGS. 3 and 4. In that context, the capabilities assessed at 48 may control, for each access option, the fluidity of the meeting experience from the perspective of the user of the computer device. Fluidity is a figure of merit expressing how smoothly the computer device is able to perform the technologic tasks that provide access to the meeting experience. For example, video of a remote speaker that appears smooth, seamless, and synchronized to the corresponding audio contributes to high fluidity; video that appears choppy, glitchy, or poorly synchronized reduces the fluidity. The overall objective of method 46 is to deliver the richest meeting experience that is (a) desired by the user and (b) available on the computer device at or above a predetermined fluidity threshold. Capability assessment at 50 supports this task.

Operationally, the fluidity is a computationally evaluated function of the assessed capability of the computer device. In some implementations, the fluidity may be optimized by maximizing a net richness of the remote meeting while preventing a net expense of the selected access modes from exceeding the assessed capability of the meeting-participant computer device. The fluidity for some access options can be assessed based on the sum of the minimum bitrates required to maintain the one or more access modes that comprise a given access option. In one, non-limiting computer-device example (viz., a state-of-the-art PC example), full-fidelity, real-time presentation of a meeting presenter requires a continuous video upload of about 2050 thousand bits per second (kbps) from the computer device of the meeting presenter and a continuous download of about 1850 kbps to the computer devices of the other meeting participants. Real-time presentation of full-fidelity audio requires an additional 36 kbps. Screen sharing typically is enacted at a lower frame rate than person video, requiring a continuous upload/download of about 240 kbps. Thus, person video may be about 57 times heavier than audio and about 10 times heavier than screen sharing. However, the upload and download bitrate may be reduced to about 1000 kbps when the background video is removed. When a user has enabled screen sharing, video of the user may be transmitted at lower resolution, about 270 kbps in some examples.

At optional step 52, one or more access options may be excluded—e.g., according to user preference. The user, even if her computer device is capable of high-speed download, may not want to see the faces of the other meeting participants. In that event, and with reference to FIG. 3, inbound-access options 30A through 30I may be excluded. Conversely a user may determine, based on the subject matter of the meeting, that she must be presented live video even if the video appears choppy due to poor network connectivity. That user may exclude access options 30H through 30L. In some examples, user exclusions may be received via a user interface of the computer device. In other examples, user preferences may be learned over the course of repeated meeting experiences on the same computer device.

At 54 a selection module of the client-server system selects, based on the one or more capabilities assessed, an access-option set including a combination of mutually compatible access modes achievable on the computer device for accessing the remote meeting experience. As noted hereinabove, the access-option set is a combination of mutually compatible modes of access to the remote meeting experience and is selected to offer the remote meeting experience at or above a threshold level of fluidity. In some implementations, the selection module computes, for every non-excluded access option, the fluidity of the meeting experience when accessed via a computer device operating according to that access option. For example, a net expense of the access-option set may be analyzed relative to a capability metric of the meeting-participant computer device to find the access-option set that maximizes the net richness while preventing a net expense from exceeding the capability metric. Note however, that when user preferences are supported, user preferences can adapt the capability metric to ensure a given access mode is implemented (e.g., force live video).

In some scenarios the assessment of richness is straightforward because it follows the natural ordering of a given menu of access options, as shown by example in FIGS. 3 and 4. In other scenarios the capabilities of a computer device may influence the richness of the meeting experience as a function of the access option. For example, if the computer device is a cell phone with a small display, then high-resolution video download may provide no richer an experience than lower-resolution download, because the user would not be able to see the difference. Furthermore, showing live video of several meeting participants on a small display, even with perfect fluidity, may actually provide a poorer experience on a small display than one in which only the primary presenter is shown. As such, the capability, expense, and/or richness metrics may be device dependent, so that different meeting-participant computer devices use different metrics for the same access mode and capability.

One or more functions of the access-option set $0$ may be used to assess richness, fluidity, and/or expense compliance. Each function may be defined according to (i.e., in dependence on) the assessed capabilities C of the computer device accessing the meeting experience. In some examples, a numeric richness function $Rc(0)$ expresses the richness of the meeting experience as a function of the selected access-option set. In some examples, a numeric fluidity function $Fc(0)$ expresses the fluidity of the meeting experience as a function of the same access-option set. In some examples, a numeric expense function $Ec(0)$ expresses the net expense of the access-option set. In one non-limiting example, one or more of the numeric functions $Rc(0)$, $Fc(0)$, and/or $Ec(0)$ may be represented by an unsigned 16-bit integer value ranging, inclusively, from 0 (corresponding to lowest richness, fluidity, and/or expense) to 65535 (corresponding to greatest richness, fluidity, and/or expense). In some scenarios, the functions may have plural components (e.g., individual components for video, audio, sharing, chatting, etc.). In some implementations, evaluated richness and fluidity functions may be stored as primitive variables in computer memory or as elements of any suitable program object. The variables or objects may be associated with client application 28, and, in other examples, with a meeting-support service executing on server 36. In other examples one or more of the functions may be represented by an integer of greater bit length, by a floating-point number of any desired precision, or by a multi-dimensional data structure such as an array (e.g., holding different components). The detailed manner of computing numeric functions $Rc(0)$, $Fc(0)$, and/or $Ec(0)$ is not particularly limited, for numerous variants lie within the spirit and scope of this disclosure. In some examples, the calling program—viz., client application 28 and/or the meeting-support service executing on server 36—draws predefined richness and fluidity values from a pair of look-up tables each indexed according to a predefined series of access options $0$. In other examples the calling program calls procedures configured to implement numeric algorithms which returns appropriate richness and fluidity values in dependence on the access option $0$. The access option may be passed to the procedures in a formal parameter list, as a shared variable, etc. In some implementations, the expense function for a selected access-option set has a format that is directly comparable to a format with which a device capability is assessed, and the fluidity is assessed by maximizing richness while ensuring that expense does not exceed capability.

In some examples, the effect of a sub-optimal capability on meeting-experience fluidity may depend on whether the user is a primary presenter or a lesser contributor to the meeting. For instance, slow upload may be tolerable for a participant discussing only one or two charts but may be intolerable for a participant intending to share a lengthy slide deck with animations or high-resolution graphics. Accordingly, in some scenarios, the fluidity and/or richness may vary in dependence on conditions other than computer-device capabilities.

In some implementations, a numeric optimization is enacted, wherein a selection module selects, based on the capabilities assessed, the optimal access option 0* achievable on the computer device (i.e., expense<capability) for accessing the remote meeting experience. The optimal access option is the access option providing the richest experience at or above a predefined fluidity threshold $F_0$, excluding any options indicated for exclusion. Thus, the optimal access option selected is the option that least degrades the richness of the meeting experience (relative to an ideally full-featured experience) while still providing satisfactory fluidity. In some examples, the fluidity threshold $F_0$ may be an adjustable parameter in method 46.

In some examples one or more aspects of the optimization may be enacted via artificial intelligence (AI), which provides robust assessment in cases where the capability assessments are incomplete estimates or have unknown reliability. AI may be used to assess a computer-device capability, evaluate the richness $Rc(0)$ for one or more access options 0, evaluate the fluidity $Fc(0)$ for one or more access options 0, and/or evaluate the expense $Ec(0)$ for one or more access option. In some examples a machine-learning (ML) model such as an artificial neural network (NN) may be used to enact the optimization. Although the fluidity $Fc(0)$ of a meeting experience is primarily a computed quantity, method 46 is also consistent with approaches in which the fluidity under a given access option is empirically determined, at least in part. In particular, features such as choppy or unsynchronized video may be detected via computer-device diagnostics and used to influence the training of an ML optimization model. In other implementations, such assessments may be performed numerically and/or heuristically.

At 62 a configuration module of the client-server system configures the client-server system to provide the meeting-participant computer device access the remote meeting using the access-option set as selected. Actions taken by the configuration module may include selecting one or more video-download channels, preparing to enact background removal for video upload, partitioning the display to present the appropriate number of video streams, configuring a graphics engine to render an animation of a remote meeting participant, etc. It is to be emphasized that the configuration enacted at 62 is not a 'one-size-fits-all' approach applied uniformly to the computer devices of all meeting participants. Rather, each computer device may be configured independently of all other computer devices and/or the server may be configured to communicate differently with different meeting-participant computer devices. Independent configurability is achievable whether the assessment, selection, and/or access-providing steps are enacted client-side or server-side (vide infra).

In some examples, steps 50 through 62 of method 46 are implemented via code modules 42 of client application 28 (with reference to FIG. 2). In other words, the foregoing steps may be implemented by the logic system of the computer device itself. This approach reduces latency, strengthens data security relative to fully cloud-based implementations, and also limits any extra network activity that may be required in order to enact the method. Nevertheless, this disclosure fully embraces examples and scenarios in which at least some of the foregoing steps are enacted by corresponding code modules of the server, in whole or in part. Server-side processing may be particularly advantageous for computationally intensive tasks, such as speech recognition and reconstruction and other AI implementations. Described below are additional advantages of server-side processing in the particular context of actions taken prior to a remote meeting experience. This disclosure also embraces examples and scenarios in which that the server and the client computer devices cooperate to enact the methods herein. In some examples a client application may share, with the server, data relating to the capabilities of the associated computer device; the server may pool together this and other 'user data' relating to the user and/or associated computer device. When that computer device subsequently requires a particular experience from the server, the server may provide the appropriate experience based on such capabilities, in accordance with richness/fluidity optimization described herein.

Continuing in FIG. 5, at 64 of method 46 the network modules of the client-server system 34 exchange between server 36 and computer devices 14 any data that may be required to support remote access to the meeting experience according to the selected access option 0* on any participating computer device. For example, if 0* for a computer device includes the option of document sharing by static download (e.g., because screen sharing cannot be achieved at threshold fluidity), then the network module of the computer device may send a request to the server to share one or more documents presented at the meeting. In the event that the share request is granted, the network module may then receive the download of the one or more documents, or, alternatively, a link to the documents. Then, as the meeting presenter pages through a shared document, the network module may receive a page-turn command having the effect of displaying on the user's computer device the page of the document that the meeting presenter is discussing.

Other types of data may be exchanged bidirectionally during or even after the meeting, to support the selected access option. In examples in which the selected access option includes the mode of requesting a recording or transcription of the meeting, a client-side network module may issue that request and then download the recording or transcription if the request is granted. In some examples, the recording may comprise a fidelity that differs from that of the live video and/or audio. Conversely, in the scenario in which another meeting participant has requested a recording or transcription, the network module may receive a request to share a recording or transcription of the user's contributions. The network module may then signal the user's permission back to the server. Other data may also be exchanged between the server and the computer devices to support remote access to the meeting experience according to the selected access options. Some additional examples will be described hereinafter.

In some examples, method 46 may include features enacted prior to the meeting experience. Typically such features are enacted primarily via code modules of the server and may not even require the computer devices of the meeting participants to be turned on. For example, at 66 of method 46 the client-server system parses meeting data pertaining to a scheduled meeting. For each participant in the scheduled meeting, the assessment module of the server assesses, at 50', the capabilities of the computer device associated with that participant. Thus the capability of a given computer system is assessed in advance of the meeting experience, in this scenario. At 54' the selection module of the server selects, based on the capability assessed, an access option achievable on the computer device for accessing the remote meeting experience. In some examples, the selection process may be analogous to that described for step 54 hereinabove.

More generally, there may be similarities and differences between the assessment and selection activities 50' and 54' enacted before the meeting and the corresponding activities 50 and 54 enacted during the meeting. One difference is that, during the meeting, the various capabilities of each user's computer device may be accurately assessed in real time and directly, whereas prior to the meeting it may be necessary to rely on indirect, heuristic, and/or previously acquired data to make an estimation. For instance, if a given user has accessed the server previously, then the server may have a stored record of the capabilities of the user's computer device (e.g., in user data 40 in FIG. 2). Accordingly, the server may enact the assessment and selection based on the stored user data. In other examples, the user data may record only the location of a given user; the location may be enough, however, to enable prediction of certain computer-device capabilities, such as network download speed and network upload speed.

In some examples, the server may be configured to detect launch of a client application corresponding to a participant of a scheduled meeting. After the launch is detected, the various code modules of the server may cooperate to determine the location and/or test the network speeds of the participant's computer device. In some examples, the server may issue any request necessary for determining the capabilities of the computer device. The configuration module on the server may then update the record of computer-device capabilities in the user data associated with that meeting participant.

Another difference between pre-meeting and in-meeting processing is that selection step 54' is provisional and not necessarily followed by configuration of any user's computer device based on the selection. Rather, in some examples, the selections enacted during the meeting experience, at 54, may override the selections made at 54'.

Continuing in FIG. 5, at 62' a configuration module of the client-server system makes whatever server-side configurations may be necessary to support the access option selected. One example server-side configuration comprises configuration for automatic question answering (Q&A). As noted hereinabove, participants in a meeting may, in some scenarios, communicate via in-meeting chat in addition to speaking with each other. However, it can be difficult to respond to in-meeting chat while speaking. Accordingly the selected access option may include automatic question answering, wherein AI executing within the client-server system is configured to assist one or more of the meeting participants in responding to questions received via in-meeting chat. More particularly, the selected access-option set may include intercepting in-meeting chat directed to a meeting participant and supplying a response to a question conveyed in the in-meeting chat. In one example, a meeting presenter may receive the question "At what temperature was the fluorescence spectrum acquired?" A Q&A module configured on the server may intercept the meeting presenter's incoming in-meeting chat, decode the question via natural-language processing (NLP), and search for and find an appropriate answer within a library of documents (e.g., documents uploaded by the meeting presenter). The Q&A module may then respond to the sender of the query, "The fluorescence spectra were acquired at 77K." In some examples, if the answer is not found within the documents uploaded by the meeting presenter, the automation module may search other accessible document libraries or the internet in order to determine an acceptable response. In order to support automatic question answering, the configuration module, at 62', may configure Q&A and network modules of the server.

Continuing in FIG. 5, at 64' the network modules of the client-server system exchange between the server and the computer devices of the meeting participants any data that may be required to support remote access to the meeting experience according to the selected access options. More particularly, based on the capabilities of the computer device assessed on the server prior to the meeting experience, the server may issue a request to the computer device. The issued request may be a request to turn on automatic question answering, to upload a document for static sharing, to enable recording, or take any preemptive action that may be advisable due to a suboptimal capability of the computer device.

In scenarios in which the user is a presenter with a slow network-upload speed, the selected access option may include upload of the user's documents in advance of the meeting. Accordingly, the network module of the server may issue a request for the upload. In some examples, the server-side network module may also be configured to receive the document upload, and, in some cases, to make it available for download by other meeting participants. In other examples, the request may be transmitted via sideband messaging (email, SMS, etc.). In examples in which a selected access option may significantly degrade the richness of a meeting experience for a user, the configuration module may notify the user to that effect. Notification may be received via the network modules of the client application, or via sideband messaging.

Alternatively or in addition, the server may issue other requests that are motivated by suboptimal capabilities of the computer devices of other meeting participants. For example, in the event that static download is selected for one or more of the meeting participants, the server-side network module may send a notification to all of the meeting presenters requesting upload of any document to be presented at the meeting. After the documents have been uploaded, the network module may send a notification to each user for whom static downloads are selected, informing them that documents are now available for download.

No aspect of the foregoing drawings or description should be considered in a limiting sense, because numerous variations, extensions, and omissions are also envisioned. For instance, the description above distinguishes client-side computer devices 14 from a server-side computer 36. In some examples, however, that distinction may be abstracted somewhat, as individual computer devices (of meeting participants and/or other parties) may be configured to cooperatively execute a peer-to-peer network service. The peer-to-peer network service may provide all of the functionality ascribed to server 36 hereinabove.

As noted above, the methods herein may be tied to a computer system of one or more computing devices. Such methods and processes may be implemented as an application program or service, an application programming interface (API), a library, and/or other computer-program product.

Figure 6:
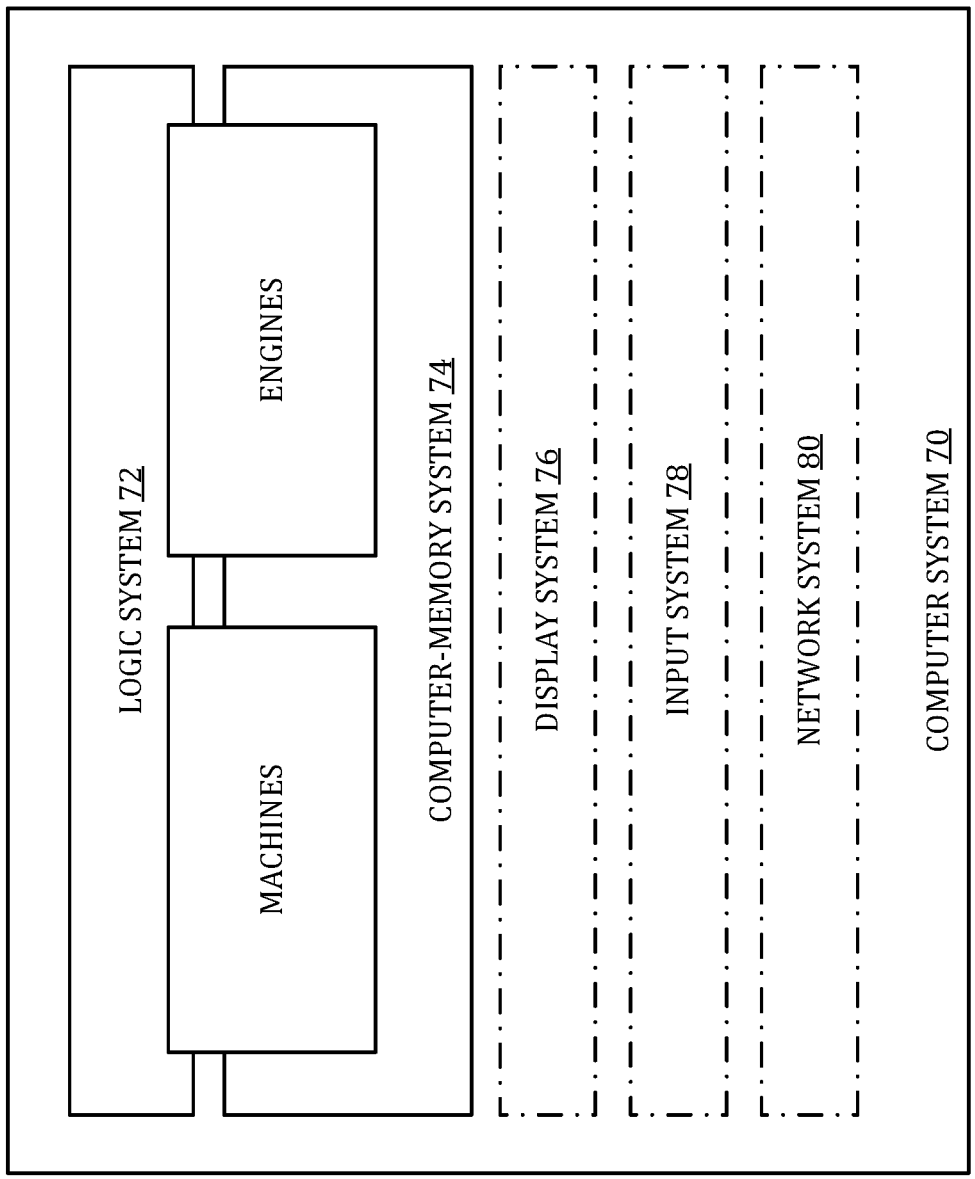
FIG. 6 shows aspects of an example computer system.

FIG. 6 provides a schematic representation of a computer system 70 configured to provide some or all of the computer system functionality disclosed herein. Computer system 70 may take the form of a personal computer, application-server computer, or any other computing device.

Computer system 70 includes a logic system 72 and a computer-memory system 74. Computer system 70 may optionally include a display system 76, an input system 78, a network system 80, and/or other systems not shown in the drawings.

Logic system 72 includes one or more physical devices configured to execute instructions. For example, the logic system may be configured to execute instructions that are part of at least one operating system (OS), application, service, and/or other program construct. The logic system may include at least one hardware processor (e.g., microprocessor, central processor, central processing unit (CPU) and/or graphics processing unit (GPU)) configured to execute software instructions. Additionally or alternatively, the logic system may include at least one hardware or firmware device configured to execute hardware or firmware instructions. A processor of the logic system may be single-core or multi-core, and the instructions executed thereon may be configured for sequential, parallel, and/or distributed processing. Individual components of the logic system optionally may be distributed among two or more separate devices, which may be remotely located and/or configured for coordinated processing. Aspects of the logic system may be virtualized and executed by remotely-accessible, networked computing devices configured in a cloud-computing configuration.

Computer-memory system 76 includes at least one physical device configured to temporarily and/or permanently hold computer system information, such as data and instructions executable by logic system 72. When the computer-memory system includes two or more devices, the devices may be collocated or remotely located. Computer-memory system 76 may include at least one volatile, nonvolatile, dynamic, static, read/write, read-only, random-access, sequential-access, location-read addressable, file-read addressable, and/or content-read addressable computer-memory device. Computer-memory system 76 may include at least one removable and/or built-in computer-memory device. When the logic system executes instructions, the state of computer-memory system 76 may be transformed—e.g., to hold different data.

Aspects of logic system 72 and computer-memory system 76 may be integrated together into one or more hardware-logic components. Any such hardware-logic component may include at least one program- or application-specific integrated circuit (PASIC/ASIC), program- or application-specific standard product (PSSP/ASSP), system-on-a-chip (SOC), or complex programmable logic device (CPLD), for example.

Logic system 72 and computer-memory system 76 may cooperate to instantiate one or more logic machines or engines. As used herein, the terms 'machine' and 'engine' each refer collectively to a combination of cooperating hardware, firmware, software, instructions, and/or any other components that provide computer system functionality. In other words, machines and engines are never abstract ideas and always have a tangible form. A machine or engine may be instantiated by a single computing device, or a machine or engine may include two or more subcomponents instantiated by two or more different computing devices. In some implementations, a machine or engine includes a local component (e.g., a software application executed by a computer system processor) cooperating with a remote component (e.g., a cloud computing service provided by a network of one or more server computer systems). The software and/or other instructions that give a particular machine or engine its functionality may optionally be saved as one or more unexecuted modules on one or more computer-memory devices.

Machines and engines (as used throughout the above description) may be implemented using any suitable combination of machine learning (ML) and artificial intelligence (AI) techniques. Non-limiting examples of techniques that may be incorporated in an implementation of one or more machines include support vector machines, multi-layer neural networks, convolutional neural networks (e.g., spatial convolutional networks for processing images and/or video, and/or any other suitable convolutional neural network configured to convolve and pool features across one or more temporal and/or spatial dimensions), recurrent neural networks (e.g., long short-term memory networks), associative memories (e.g., lookup tables, hash tables, bloom filters, neural Turing machines and/or neural random-access memory) unsupervised spatial and/or clustering methods (e.g., nearest neighbor algorithms, topological data analysis, and/or k-means clustering), and/or graphical models (e.g., (hidden) Markov models, Markov random fields, (hidden) conditional random fields, and/or AI knowledge bases)).

When included, display system 76 may be used to present a visual representation of data held by computer-memory system 76. The visual representation may take the form of a graphical user interface (GUI) in some examples. The display system may include one or more display devices utilizing virtually any type of technology. In some implementations, display system may include one or more virtual-, augmented-, or mixed reality displays.

When included, input system 78 may comprise or interface with one or more input devices. An input device may include a sensor device or a user input device. Examples of user input devices include a keyboard, mouse, or touch screen.

When included, network system 80 may be configured to communicatively couple computer system 70 with one or more other computer systems. The network system may include wired and/or wireless communication devices compatible with one or more different communication protocols. The network system may be configured for communication via personal-, local- and/or wide-area networks.

In conclusion, one aspect of this disclosure is directed to a method for one or more meeting-facilitating machines to provide access to a remote meeting. The method comprises assessing a capability metric of a meeting-participant computer device and selecting an access-option set including a combination of mutually compatible access modes. Each access mode is characterized by (a) an expense metric comparable to the capability metric and (b) a richness metric indicating a relative level of richness the access mode contributes to the remote meeting. The access-option set is selected to maximize a net richness of the remote meeting while preventing a net expense of the access-option set from exceeding the capability metric. The method further comprises providing the meeting-participant computer device access to the remote meeting using the access-option set. This method provides numerous technical effects—e.g., the meeting-participant computer device is not overburdened with network and/or processing tasks that would otherwise result in choppy video.

In some implementations, the access-option set includes an access mode selected from a plurality of different access modes providing alternative meeting experiences at different expenses, as indicated by corresponding expense metrics of the plurality of different access modes, with different levels of richness, as indicated by corresponding richness metrics of the plurality of different access modes. This provides the added technical effect of potentially enabling access modes of superior richness on the meeting-participant computer device, provided that such modes are achievable with adequate fluidity.

In some implementations, the access mode selected from the plurality of different access modes providing alternative meeting experiences is a video type access mode selected from a plurality of different video type access modes providing alternative video experiences. In some implementations, the access mode selected includes real-time presentation and/or upload of foreground video. In some implementations, the access mode selected includes real-time presentation and/or upload of video at reduced fidelity. In some implementations, the access mode selected includes presentation of an animation to represent one or more meeting participants. In some implementations, the access mode selected includes upload of facial markers and/or skeletal coordinates for rendering an animation of a meeting participant. In some implementations, the access mode selected includes rejection of live video download and/or upload. These implementations instantiate the above technical effects for video presentation. In some implementations, the access mode selected includes intercepting in-meeting chat directed to a meeting participant and supplying a response to a question conveyed in the in-meeting chat. This provides an added technical effect of automating the meeting participant's work of answering in-meeting chat questions. In some implementations, the access mode selected includes enacting and/or uploading a page-turn instruction. This provides an added technical effect of synchronizing the pages viewed by all the meeting participants in the event that video screen sharing is not enabled. In some implementations, the capability metric includes a number in a capability data structure, and wherein the net expense includes a number in a net expense data structure equaling a sum of the expense metrics from each access mode in the access-option set. This contributes to the technical effect of a computational framework by which the method can store and retrieve the capability and the expense metrics. In some implementations, the net richness includes a number in a net richness data structure and equaling a sum of the richness metrics from each access mode in the access-option set. In some implementations, the net richness is maximized numerically. In some implementations, the net richness is maximized heuristically. In some implementations, the net richness is maximized via artificial intelligence. These implementations provide added technical effects of a related computational framework for the richness. In some implementations, the capability metric is indicative of one or more of a network-upload speed and a network-download speed of the meeting-participant computer device, for more particular technical effects.

Another aspect of this disclosure is directed to a method for providing access to a remote meeting experience via a computer device. The method comprises (a) assigning a numeric capability metric to a capability data structure based on estimating a capability of the computer device; (b) receiving a request prior to the meeting experience based on the capability estimated; (c) selecting an access option achievable on the computer device for accessing the remote meeting experience, wherein the access option is a combination of mutually compatible electronic-display or network data-transfer modes for access to the remote meeting experience and is selected to offer the remote meeting experience at or above a threshold level of a numeric fluidity metric, and wherein the fluidity metric is evaluated in dependence on the capability metric and stored in a fluidity data structure; and (d) configuring the computer device to access the remote meeting experience using the access option selected. In this manner, the method provides a technical effect of preventing the computer device from being overburdened with network and/or processing tasks and providing choppy video as a consequence. In some implementations the request is a content-upload request.

Another aspect of this disclosure is directed to a computer device configured to access a remote meeting experience, the computer device comprising a logic system and, coupled operatively to the logic system, a computer-memory system holding instructions that cause the logic system to execute a client application, the instructions including (a) instructions to assign a numeric capability metric to a capability data structure based on estimating a capability of the computer device, (b) instructions to select an access option achievable on the computer device for accessing the remote meeting experience, wherein the access option is a combination of mutually compatible electronic-display or network data-transfer modes for access to the remote meeting experience and is selected to offer the remote meeting experience at or above a threshold level of a numeric fluidity metric, and wherein the fluidity metric is evaluated in dependence on the capability metric and stored in a fluidity data structure, and (c) instructions to configure the computer device to access the remote meeting experience using the access option selected. In some implementations the computer device further comprises a network component, the capability is a first capability, and the instructions further include instructions to exchange data with a remote server based on a second capability estimated on the remote server. A specific technical effect is that the computer device is not overburdened with network and/or processing tasks that result in choppy video.

This disclosure is presented by way of example and with reference to the attached drawing figures. Components, process steps, and other elements that may be substantially the same in one or more of the figures are identified coordinately and described with minimal repetition. It will be noted, however, that elements identified coordinately may also differ to some degree. It will be further noted that the figures are schematic and generally not drawn to scale. Rather, the various drawing scales, aspect ratios, and numbers of components shown in the figures may be purposely distorted to make certain features or relationships easier to see.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. Enacted by a cloud-server system with network access to a meeting-participant computer device, a method to provide access to a remote meeting via the meeting-participant computer device, the method comprising:
 automatically assessing a capability metric of the meeting-participant computer device;
 automatically selecting an access-option set including a combination of two or more mutually compatible access modes selected based on the capability metric from menus of available access modes, the menus supporting a first access-option set with live background-video reception and a second access-option set without the live background-video reception,
  wherein each access mode is characterized by an expense metric comparable to the capability metric and by a richness metric indicating a relative level of richness that the access mode contributes to the remote meeting,
  wherein the access-option set is selected to maximize a net richness of the remote meeting while preventing a net expense from exceeding the capability metric, and
  wherein the first access-option set causes the meeting-participant computer device to receive live background video of another meeting participant, and the second access-option set causes the meeting-participant computer device to present a foreground representation of the other meeting participant without the live background video; and
 providing the access to the remote meeting via the meeting-participant computer device using the automatically selected access-option set.

2. The method of claim 1 wherein the access-option set includes an access mode selected from a plurality of different access modes providing alternative meeting experiences at different expenses, as indicated by corresponding expense metrics of the plurality of different access modes, with different levels of richness, as indicated by corresponding richness metrics of the plurality of different access modes.

3. The method of claim 2 wherein the access mode selected from the plurality of different access modes providing alternative meeting experiences is a video type access mode selected from a plurality of different video type access modes providing alternative video experiences.

4. The method of claim 3 wherein the foreground representation of the other meeting participant includes live foreground video of the other meeting participant.

5. The method of claim 3 wherein the access mode selected includes real-time presentation and/or upload of video at reduced fidelity.

6. The method of claim 3 wherein the foreground representation of the other meeting participant includes facial markers and/or skeletal coordinates for rendering an animation to represent the other meeting participant.

7. The method of claim 3 wherein the access mode selected includes upload of facial markers and/or skeletal coordinates for rendering an animation of a meeting participant.

8. The method of claim 3 wherein the access mode selected includes rejection of live video download and/or upload.

9. The method of claim 2 wherein the access mode selected includes intercepting in-meeting chat directed to a meeting participant and supplying a response to a question conveyed in the in-meeting chat.

10. The method of claim 2 wherein the access mode selected includes enacting and/or uploading a page-turn instruction.

11. The method of claim 1 wherein the capability metric includes a number in a capability data structure, and wherein the net expense includes a number in a net expense data structure equaling a sum of the expense metrics from each access mode in the access-option set.

12. The method of claim 1 wherein the net richness includes a number in a net richness data structure and equaling a sum of the richness metrics from each access mode in the access-option set.

13. The method of claim 12 wherein the net richness is maximized numerically.

14. The method of claim 1 wherein the net richness is maximized heuristically.

15. The method of claim 1 wherein the net richness is maximized via artificial intelligence.

16. The method of claim 1 wherein the capability metric is indicative of one or more of a network-upload speed and a network-download speed of the meeting-participant computer device.

17. Enacted by a cloud-server system with network access to a meeting-participant computer device, a method to provide access to a remote meeting via the meeting-participant computer device, the method comprising:
 automatically assigning a capability metric to a capability data structure based on estimating a capability of the meeting-participant computer device;
 automatically selecting an access-option set including a combination of two or more mutually compatible access modes selected based on the capability metric from menus of available access modes, the menus supporting a first access-option set with live document sharing and a second access-option set with document download in lieu of the live document sharing,
  wherein each access mode is characterized by a richness metric indicating a relative level of richness that the access mode contributes the remote meeting,
  wherein the access-option set is selected to maximize a net richness of the remote meeting at or above a threshold level of a numeric fluidity metric evaluated in dependence on the capability metric and stored in a fluidity data structure, and
  wherein the first access-option set causes the meeting-participant computer device to share a document live during the meeting, and the second access-option set causes the meeting-participant computer device to exchange a static download of the document; and
 providing the access to the remote meeting via the meeting-participant computer device using the automatically selected access-option set.

18. The method of claim 17 further comprising sending a content-upload request to the meeting-participant computer device.

19. A cloud-server system with network access to a meeting-participant computer device, the cloud-server system comprising:
 a logic system; and
 coupled operatively to the logic system, a computer-memory system holding instructions that cause the logic system to provide access to a remote meeting via the meeting-participant computer device, the instructions including:
  instructions to automatically assess a capability metric of the meeting-participant computer device, instructions to automatically select an access-option set including a combination of two or more mutually compatible access modes selected based on the capability metric from menus of available access modes, the menus supporting a first accessoption set with live audio reception and a second access-option set with recorded audio reception, wherein each access mode is characterized by an expense metric comparable to the capability metric and by a richness metric indicating a relative level of richness that the access mode contributes to the remote meeting, wherein the access-option set is selected to maximize a net richness of the remote meeting while preventing a net expense from exceeding the capability metric, and wherein the first access-option set causes the meeting-participant computer device to receive live audio of the remote meeting, and the second access-option set causes the meeting-participant computer device to receive recorded audio of the remote meeting, and instructions to provide the access to the remote meeting via the meeting-participant computer device using the automatically selected access-option set.

\* \* \* \* \*